Sept. 19, 1939.  H. LIST  2,173,282
ELECTRIC MOTOR
Filed Nov. 22, 1937  2 Sheets-Sheet 1

Inventor:
Heinrich List
per A. D. Kirkpatrick
ATTORNEY

Sept. 19, 1939.     H. LIST     2,173,282
ELECTRIC MOTOR
Filed Nov. 22, 1937     2 Sheets-Sheet 2
Fig. 4
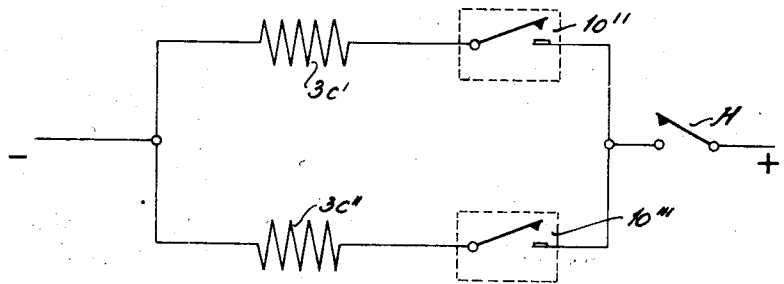
Fig. 5     Fig. 6
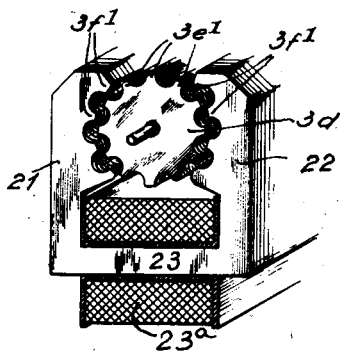 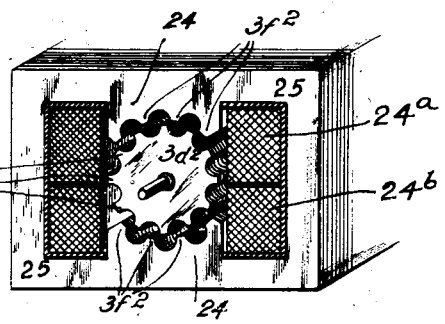
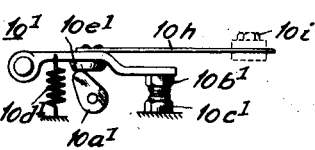
Fig. 7
Fig. 8
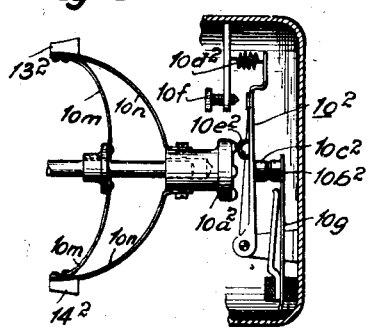
Heinrich List Inventor:
per H. D. Fitzpatrick
ATTORNEY.

Patented Sept. 19, 1939

2,173,282

UNITED STATES PATENT OFFICE 2,173,282

ELECTRIC MOTOR

Heinrich List, Berlin-Lichterfelde, Germany

Application November 22, 1937, Serial No. 175,898
In Germany December 12, 1934

11 Claims. (Cl. 171—222)

This invention relates to electric motors.

One object of the present invention is to provide an electric motor which is relatively inexpensive to manufacture and simple to assemble, its component parts being for example capable of manufacture by mass production methods.

A second object of the invention is to provide an electric motor which can readily be designed for a desired range of speed.

A third object of the invention is to provide a motor which will develop a high turning moment with a short starting-up time.

A fourth object of the invention is to provide a motor which will operate at a substantially constant speed.

Figure 1:
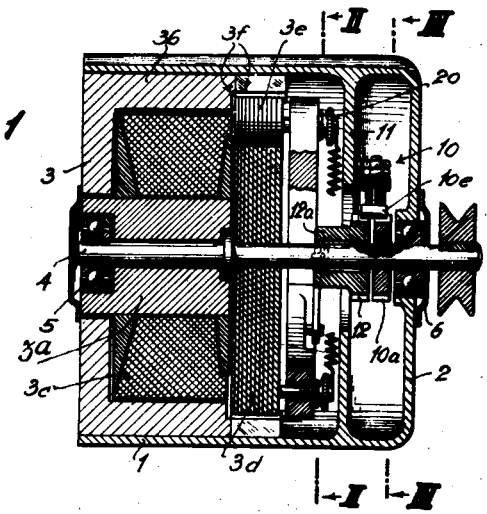
Figure 2:
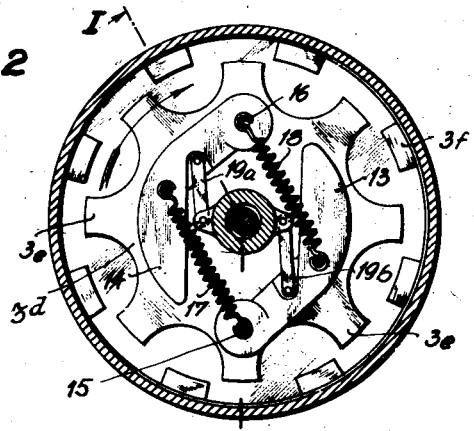
Figure 3:
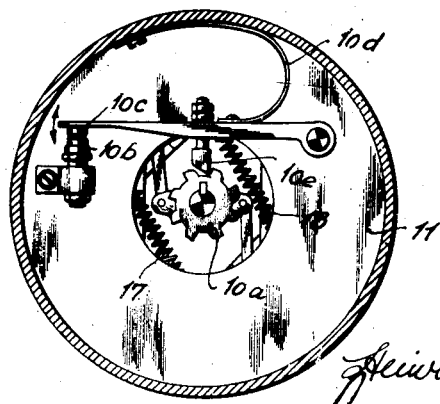

Further details of the invention are to be found in the following description of the drawings, which illustrate examples of the invention. Thus the drawings show:

Fig. 1 a longitudinal section of one embodiment, the section being taken on the line 1—1 of Fig. 2;

Fig. 2 a section on the line 2—2 of Fig. 1;

Fig. 3 a section on the line 3—3 of Fig. 1;

Fig. 4 a circuit diagram, the circuit including a plurality of interrupters;

Figs. 5 and 6 details of modified stator constructions;

Figs. 7 and 8 two interrupters.

Referring to the drawings:

The motor according to Figs. 1 to 3 is inserted in a housing which consists essentially of a cylindrical portion 1 for receiving a rotation-producing magnet device, and a portion 2 which provides a bearing-mounting. In order that the parts of the rotation-producing magnet devices used in the motors may, wherever possible, be of a kind which are used also for other purposes and can, for example, be manufactured by mass production methods, desirably, the magnet device 3 is of such a construction that it can be introduced as a unit into the housing 1. The stator structure of the device shown in Figs. 1, 2 and 3 is similar to the known pot-shaped magnets made preferably by a stamping or drawing process, that is to say, the stator iron consists of an axial core 3a which is like a flange-ended yarn-bobbin, and a hollow cylindrical part 3b connected at one end to the part 3a, and constituting an iron return-path. The cylindrical part 3b is open at one end and is closed at the other end, the core 3a extending from the closed end to the open end. These parts 3a and 3b enclose the magnetizing means for the magnet device, such means being constituted as an exciting winding 3c.

The rotor of the magnet-device consists of a rotatable armature structure denoted by 3d, which is arranged at the open end of the cylindrical part 3b and is inserted in an air-gap formed between one of the flanges of the part 3a and the cylindrical part 3b and with the stator structure constitutes a magnetic flux path. At its periphery the armature is regularly toothed so as to provide working poles 3e all of the same polarity as one another. The marginal portion of the part 3b which encloses the armature 3d is likewise toothed to provide working poles 3f of the same orientation as those of the armature and all of the same polarity as one another. The armature is fixed on a shaft 4 which passes axially through the core 3a of the stator in such a way as to be freely rotatable. At one end the shaft is journalled in the stator by means of the ball bearing 5 and at its other end in the bearing mounting 2 of the housing 1 by a further ball bearing 6. With bearings of this nature a simple assembly of the motor is possible. In Figs. 1 and 2 it can be seen that the armature in the field-completing position (that is to say, when its poles are directly opposite the stator poles) fills the air-gap in the stator iron at the zones of the stator poles. Use of this principle, which may be referred to as the principle of the "gap-filling" armature, produce a relatively very high turning moment with a short starting-up time for a given iron and copper weight. The number of the working poles is, other considerations being equal, determined with reference to the rotational speed and it is an advantage that by incorporating an especially large number of poles a low speed motor can be constructed whose turning moment is relatively large.

The stator structure of the rotation-producing magnet instead of being of the closed housing or pot-shaped form shown with reference to Figs. 1, 2 and 3, may be of U-form as shown in Fig. 5 in which case the armature $3d^1$ with its working poles $3e^1$ is arranged to rotate between limbs 21 and 22 which are likewise provided with working poles $3f^1$. The limbs extend from a core portion 23 of the stator, which portion is wound by an electro-magnet 23a. As a further alternative a stator structure of the mantle-type may be selected, as shown by Fig. 6. The stator is constituted by a closed yoke 25 with an interior transverse limb or core 24, the limb or core being interrupted by a large gap and provided with working poles $3f^2$ at opposite sides of the gap.

In the last case, the armature 3d² is arranged to rotate in the gap in the core 24. The two portions of the core 24 are respectively wound by electro-magnets 24a, 24b, which together surround the gap in which the armature works. As an electric motor of the nature under discussion operates exclusively as an interrupter-controlled motor, the iron magnetic flux path is heavily taxed by the strong magnetic changes and it is desirable in order to increase the magnetic efficiency to construct the flux path of laminated iron.

Manifestly, if it is desired that the motor be self-starting, the armature poles in the armature's rest-position must bear to the stator poles a relative disposition somewhat as illustrated in Fig. 2, the armature pole centres being displaced a little in the clockwise direction (with reference to Fig. 2) from the stator gap-centres so that when the exciting current is switched on the armature rotates in the clockwise direction. In order that this disposition may be automatically attained an appropriate catch device may be provided which stops and holds the armature in the position shown in this figure. On the grounds of clearness such a catch device has not been shown. It may, for example, consist of a latch or the like which is upset mechanically or by a small auxiliary magnet to release the armature when the motor is switched on. As a rule, however, the motor is started up by hand and only where self-starting cannot be dispensed with is a stop device of this nature included.

Reference 10 denotes generally an interrupter in the exciting circuit of the rotation-producing magnet-device 3 the interrupter consisting, in the embodiment of Figs. 1 to 3, of a notched, or toothed, disc 10a on the motor shaft and of the contacts 10b and 10c. The notched disc 10a has as many regularly oriented notches as the armature of the rotation-producing magnet-device has working poles. The contact 10b is fixed but adjustable, whereas the contact 10c is carried by a lever loaded by the spring 10d, the lever bearing on the notched disc 10a by the intermediary of the abutment 10e. In the interests of simplicity in assembly and subsequent adjustment, the parts 10a, 10b and 10c are mounted on a partitioning wall 11 in the housing 1.

The exciting winding 3c of the rotation-producing magnet-device is connected to the voltage supply through the interrupter contacts 10b, 10c, and a main switch such as H, Fig. 4, which is not illustrated in detail. The notched disc 10a is set on the shaft 4a relative to the rotation-producing magnet-device in such a way that the contacts 10b, 10c are closed, momentarily, when the armature poles assume with reference to the stator poles a disposition somewhat as shown in Fig. 2, being separated again, at the latest, when the centres of the armature poles are aligned with the centres of the stator poles. In this way, if the armature is in the rest-position (Fig. 2), the contacts 10b, 10c being therefore closed, and the exciting circuit is completed by closing the switch H, the rotation-producing magnet-device 3 is excited, and the armature 3d and such parts as are connected with it by the intermediary of the shaft 4 are set in motion. The armature arrives, with a certain velocity, at the field completing position. Approximately at this moment or shortly before it the notched disc 10a separates the contacts 10b, 10c, but the armature 3d and the parts connected with it continue to move, under the momentum of the velocity already attained, passing from the field completing position into a position which corresponds again with the position shown in Fig. 2. Hereupon the contacts 10b, 10c are again closed and the magnet-device is again excited. This cycle is repeated indefinitely, and continuous rotational movement is obtained.

In order to regulate accurately the rotational speed of the motor the interrupter 10 is constituted as a speed regulator whose functioning towards maintaining a constant speed is founded on the fact that the timing of the current impulses it permits is varied with reference to the relative positioning of the armature and the stator in dependence upon the speed, the arrangement being such that it is the duration of the current impulses which is varied. This regulation of the rotational speed of the motor occurs when the designed speed is departed from in either sense. To this end, a second notched disc 12, of the same orientation as the notched disc 10a, is mounted, so as to be freely rotatable, on the shaft 4 beside the notched disc 10a. As can be seen in Fig. 1, the adjacent faces of the notched discs 10a and 12 almost touch one another, and the abutment 10e is sufficiently broad that it engages both these discs. The two discs may therefore be regarded, as far as the function of the lever carrying the contact 10c is concerned, as constituting components of a single variable pitch notched or toothed disc assembly, because if disc 12 is rotated somewhat relative to the disc 10a the pitch of the resultant notch formed by the two discs increases or decreases, depending on the initial relative disposition of the two discs. Manifestly this will vary, with reference to the relative positioning of the armature and the stator, the time when the current impulse is made and/or broken by the interrupter contacts 10b and 10c with a corresponding increase or decrease in the duration of, (or with a corresponding displacement of,) the current impulse. From this it follows that by appropriately acting on the disc 12 by means of a speed-influenced device, it is possible to obtain the desired object of automatically maintaining the rotational speed constant.

In the example shown in Figs. 1 to 3 centrifugally acting weights constitute the speed influenced device. Thus two centrifugally-acting weights 13, 14 are pivoted on the armature 3d at 15 and 16. Alternatively they may be pivoted on a separate disc connected with the armature. Each weight is under the action of a tension spring 17 or 18, which at one of its ends is anchored on the pivot pin 15 or 16, of the other weight. Each weight is linked by means of a link 19a or 19b with a boss 12a on the disc 12.

By appropriately adjusting the tension of the springs 17 and 18 the motor can be adjusted to operate at a desired speed. To this end one end of each spring is connected with its anchorage by a tension adjusting device, in this case a nut 20. Assuming that the motor rotates at the designed speed, the notched disc 12 assumes a definite "normal" position in relation to the notched disc 10a. If the rotational speed should for any reason, for example in consequence of an increase or reduction in the load, vary in either sense the centrifugally-acting weights 13 and 14 act correspondingly to alter, through the intermediary of the links 19a and 19b, the relative setting of the notched disc 12 in such a manner that the rotational speed again approaches the designed value.

In the explanation given above of the functioning of the motor it was assumed, in the interests of simplicity, that the interrupter contacts 10b and 10c were normally closed under the influence of the notched disc 10a 12 when the armature of the rotation producing magnet-device was in the position shown in Fig. 2 and were again separated when the armature poles 3e were aligned with the stator poles 3f in the field completing position. It will be clear however that this must be altered in practice to take into account the time required for the growth and dispersal of the magnetic field. Care must therefore be taken that the switching on and off takes place with a given phase displacement in relation to the armature positions so that the armature receives the full field in the position most favourable from turning moment considerations and that damping or braking of the armature, due to lag, is prevented after it has passed the field closing position. Hence, as far as the speed governing is concerned, care should be taken that the variation in the timing occurs within the boundaries indicated above, in order to maintain a good efficiency.

In the case of the regulating device illustrated in Figs. 1, 2 and 3 it is desirable to design the disc 10a in such a way that by it alone, that is when the disc 12 is coincident with it, the contacts 10b and 10c are closed during the entire time which the armature 3e requires to move from the position shown in Fig. 2 to the field completing position. In this way sufficient possibility for regulation is created, that is to say the possibility is given by rotation of the disc 12 of advancing or delaying respectively, with reference to the positions of the armature, the closing or separation of the contacts.

Figs. 5 and 6 are given to illustrate that the invention is not confined to motors of the type including a pot-shaped stator such as illustrated by Figs. 1 to 3. It will be understood that, in a motor such as illustrated by Fig. 5 or Fig. 6, the armature shaft and the stator would be provided with an interrupter such as denoted generally by 10 in Fig. 1, and a speed-responsive device such as embodied in the centrifugally-acting weights 13, 14 would also be provided to cause the interrupter to act as a speed regulator.

Although a centrifugally-acting weight device, especially one such as has been described, is to be recommended for the speed regulator, it will however be clear that the principle used in the invention can also be applied, in combination with the motor, if any other speed-influenced device is used. For example, mechanically oscillatory elements may be used connected directly or indirectly to the interrupter.

In Fig. 7 a speed-influenced device of this nature is illustrated, said device being applicable to an electric motor whose stator, electromagnet and armature have the same characteristics as those according to Figs. 1 and 2, or Fig. 5 or Fig. 6. The contact-carrying lever is provided with the mechanically oscillatory element which is constituted as a freely swinging leaf spring 10h which under certain circumstances may support a weight 10i (shown only by dotted lines in the drawings) in such a way that this latter is adjustable so that the natural frequency of the spring 10h may be varied within limits. The lever is operated by a cam $10a^1$ which in turn is rotated at a speed which accords with the number of armature poles. The restoring spring $10d^1$ acts to ensure satisfactory closure of the contacts $10b^1$ and $10c^1$.

If the motor is of large dimensions, difficulties may arise in certain circumstances in controlling, by means of a single interrupter, the switch load involved in switching on the exciting current of the rotation-producing magnet-device. In order to ovecome such difficulties recourse may be had to several interrupters preferably operated in common, e. g. by the same notched discs 10a, 12. The exciting winding 3c of the rotation-producing magnet-device would be divided in accordance with the number of interrupters used, and each part of the exciting winding would be in the circuit of an interrupter. In Fig. 4 a circuit diagram is shown in which the exciting winding 3c is divided into two parts 3c' 3c''. One of the two interrupters 10', 10''' is in circuit with each of these parts.

The centrifugally-acting weight device in which the centrifugally-acting weights are pivoted about axes which are parallel to the armature shaft is especially convenient, in that pivoting of the weights can be translated with the help of simple links 19a, 19b into a rotation of the notched disc 12. However, instead of translating the displacement of the weights into a turning of the discs 12, the displacement of the centrifugal weights 13, 14 can instead be translated, as Fig. 8 shows, into an axial displacement. The device according to Fig. 8 is applicable to an electric motor whose stator, electro-magnet and armature have the same characteristics as those according to Figs. 1 and 2, or Fig. 5 or Fig. 6. In this case the centrifugally-acting weights 13, 14 are fixed to the springs 10m fast on the shaft of the regulator, and to the springs 10n secured to the notched disc $10a^2$. The notched disc is mounted so as to be capable of limited axial movement on the armature-driven shaft, for example by means of a socket. The notched disc $10a^3$ in this case, desirably, no longer has notches or teeth on its periphery; on the contrary the notches or teeth are provided on its end face radially separated and in number according with the number of working poles and the notches are associated with the abutment $10e^2$ of the interrrupter $10^2$. A screw 10f permits accurate adjustment of the extent which the abutment $10e^2$ of the interrupter lever penetrates into the notches of disc $10a^2$, the lever being loaded by the return spring $10d^2$. The second contact $10b^2$ is resiliently mounted and maintained in its rest or limit position by spring 10g. If, due to variation in the rotational speed, the displacement of the centrifugally-acting weights $13^2$ and $14^2$ becomes greater or smaller the notched disc $10a^2$ is displaced axially along the shaft of the regulator in accordance with the extent of the variation. The duration of the operative engagement of the notched disc $10a^2$ and the abutment $10e^2$ is thereby lengthened or shortened and effective speed regulation is thus obtained.

I claim:

1. An electric motor comprising a stator having a series of poles, a rotor having a series of poles corresponding to those on the stator, the rotor and the stator constituting between them a magnetic flux path, magnetising means for the flux path constituted as an exciting winding, an interrupter adapted to cause intermittent excitation of the winding so that at each excitation the poles on the rotor, with the rotor, are magnetically moved in the direction of desired rotation towards alignment each with a pole on the stator and when the excitation is interrupted are permitted to move past the position of alignment to the position of next excitation, and a speed-influenced device acting to vary the function of the interrupter towards maintaining constant the speed of the motor, the interrupter comprising co-axial and relatively rotatable circular toothed elements constituting a toothed assembly, and relatively movable contacts in circuit with the exciting winding of which one is mounted on a carrier bearing on the teeth of the assembly, whereby the latter effects alternate closure and separation of the contacts, the action of the speed-influenced device being to effect relative rotation between said elements so as to vary the dimensions of the teeth of the assembly.

2. An electric motor according to claim 1 in which the speed-influenced device comprises a carrier in driven connection with the rotor and centrifugally-acting weights pivoted on the carrier about axes parallel with the axis of said toothed elements, links being provided connecting said weights to one of said toothed elements so as to move it relative to the other in accordance with the speed of the motor and thereby vary the dimensions of the teeth of the assembly.

3. An electric motor which comprises a stator embodying an exciting winding and having a series of poles; a rotatable armature having a series of poles corresponding to those on the stator; a speed-influenced device comprising a carrier, and a plurality of centrifugally-acting weights pivoted on said carrier about axes parallel with the axis of the armature; and an interrupter adapted to cause intermittent excitation of the stator's exciting winding so that the poles on the armature, with the armature, are moved at each excitation in the same sense towards alignment each with a pole on the stator and when the excitation is interrupted are permitted to move past the position of alignment to the next position of excitation, the interrupter comprising a circular toothed assembly and relatively movable contacts in circuit with the exciting winding and of which one is mounted on a carrier bearing on the toothed assembly, whereby the latter effects closure and separation of the contacts to cause the intermittent excitation of said exciting winding, the assembly consisting of two relatively rotatable circular toothed elements coaxial with the armature, one of them being in driven connection with the armature, and links being provided connecting the other to the centrifugally-acting weights so that, in accordance with the speed of the armature, relative rotation is effected between the elements to vary the pitch of the teeth of the assembly and thereby vary the timing of the excitations with reference to the relative positions of the armature and stator poles.

4. An electric motor comprising a stator constituted as a substantially cylindrical pot-shaped structure having an internal axial core and embodying an exciting winding disposed around the core within said structure, which structure is open at one end and bears pole pieces at the rim at the open end; a rotatable armature disposed at the open end of the stator structure and bearing radially projecting pole pieces similarly oriented as the poles on the stator structure, the armature being mounted on a shaft which axially penetrates the axial core of the stator structure; a speed-influenced device comprising a plurality of centrifugally-acting weights pivoted on the armature about axes parallel with the armature shaft and resilient members restraining the centrifugal action of the weights; an interrupter adapted to effect intermittent excitation of the stator's exciting winding so that the poles on the armature, with the armature, are moved in the same sense at each excitation towards alignment each with a pole on the stator and when the excitation is interrupted are permitted to move past the position of alignment into the position of next excitation, the interrupter comprising a fixed contact and a movable contact both in circuit with the exciting winding and the latter being mounted on a lever, resilient means urging the lever to contact closing position, a circular toothed assembly, an abutment on the lever bearing on the toothed assembly and adapted to follow the profile of the teeth so as alternately to close and separate the contacts and thereby cause the intermittent excitation of the exciting winding, the toothed assembly being constituted by two circular toothed elements co-axial with the armature shaft, one being in driven connection therewith and the other being free to rotate relative thereto; links being provided connecting the latter element to the centrifugally-acting weights so that relative rotation between the elements to vary the pitch of the teeth of the assembly is effected in accordance with the speed of the armature.

5. An electric motor which comprises a stator having a series of poles all of the same polarity as one another; a rotor having a series of poles all of the same polarity as one another and corresponding in angular spacing to those on the stator, the rotor and the stator constituting between them a magnetic flux path; magnetising means for the flux path constituted as an exciting winding; an interrupter adapted to cause intermittent excitation of the exciting winding so that at each excitation the poles on the rotor are magnetically moved in the direction of desired rotation, towards alignment each with a pole on the stator and when the excitation is interrupted are permitted to move past the position of alignment to the position of next excitation, the interrupter comprising relatively movable contacts in circuit with the exciting winding, a cam in operative connection with the rotor and a carrier supporting one of the contacts and bearing on the cam, whereby the cam effects closure and separation of the contacts to cause the intermittent excitation of the exciting winding; and a speed-influenced device applied to said interrupter, the action of the speed-influenced device being to vary, in accordance with the speed and with reference to the relative positioning of the poles on the rotor and the stator, the duration of time of the individual excitations permitted by the interrupter.

6. An electric motor comprising a stator constituted as a pot-shaped structure having an internal axial core, and embodying an exciting winding disposed around the core within said structure, which structure is open at one end and bears poles at the rim at the open end; a rotatable armature disposed at the open end of the stator structure and bearing radially projecting poles similarly oriented as the poles on the stator structure, the armature being mounted on a shaft which axially penetrates the axial core of the stator structure; an interrupter adapted to effect intermittent excitation of the stator's exciting winding, so that the poles of the armature, with the armature, are moved at each excitation in the same sense towards alignment each with a pole on the stator and when the excitation is interrupted are permitted to move past the position of alignment to the position of next excitation, the interrupter comprising a fixed and a movable contact both in circuit with the exciting winding and a lever on which the movable contact is mounted, resilient means urging the lever to contact closing position and a cam on which the lever bears and which serves to close and separate the contacts thereby effecting the intermittent excitation of the exciting winding, the cam being in driven connection with the armature; and a speed-influenced device which co-operates with said cam and acts, when the speed of the motor varies in either sense, towards maintaining constant the speed of the motor.

7. An electric motor comprising two structures one of which is rotatable in relation to the other and which between them constitute a magnetic flux path and have each a series of poles corresponding in angular spacing with the poles on the other structure, magnetising means for said flux path, an interrupter comprising relatively movable contacts both in electrical circuit with the magnetising means, a resilient mounting for one of said contacts, a toothed device in operative connection with the rotatable one of said structures, and a carrier which supports one of the contacts and bears upon the teeth of the toothed device whereby the latter serves to close and separate the contacts, and thereby cause the alternate energisation and de-energisation of the magnetising means, and a speed-influenced device driven by the rotatable one of said structures and acting to vary the lift of the toothed device's teeth with reference to the contact carrier.

8. In an electric motor including a stator embodying a winding by which the stator can be magnetically excited and including also a shaft driven by the motor's armature, an interrupter comprising relatively movable contacts in circuit with the exciting winding, a toothed device axially movable on said shaft and of which the teeth project from a surface normal to said shaft, a lever supporting one of said contacts, an abutment on said lever, resilient means urging the abutment to bear on the teeth of the toothed device whereby the latter effects closure and separation of the contacts causing thereby intermittent excitation, and resilient means urging the other contact into a limit position towards the lever-supported contact; and a speed-influenced device comprising centrifugally-acting weights, resilient members connecting the weights with said shaft and further resilient members connecting the weights with the toothed device and acting to axially move the toothed device under the control of said weights.

9. An electric motor comprising a stator, an electro-magnetic winding disposed within said stator, an armature rotatably mounted on said stator, a series of projecting poles provided on said stator, a series of projecting poles provided on said armature and arranged to co-operate with the stator poles, an interrupter electrically connected in circuit with said winding, means driven by the armature to operate said interrupter at a series of periods per revolution so as to cause an electric-current impulse to be passed through said winding at each of said periods, and a speed-responsive speed-regulator driven by the armature and applied to said interrupter to vary the duration of said periods, the said speed-regulator consisting of two toothed elements, a series of teeth on one of said elements being in variable registry with a series of teeth on the other, and a speed-responsive device driven by the armature and connected to one of said elements for adjustment thereof in relation to the other to vary the extent of registry between the teeth, and said interrupter comprising interacting contacts one of which is movable to-and-from the other under the control of the teeth of both of said elements.

10. In an electric motor including a stator embodying a winding by which the stator can be magnetically excited and including also a shaft driven by the motor's armature, an interrupter comprising inter-acting contacts in circuit with said winding, means for alternately opening and closing said contacts to cause electric-current impulses to be passed through said winding in order to cause rotation of the armature, said means consisting of two elements each having a series of teeth and the teeth of one element being registrable to a variable extent with those of the other element, and a speed-responsive device driven by said shaft and connected to one of said elements for adjustment thereof in relation to the other to vary the extent of registry between the teeth and thus vary the duration of the individual impulses.

11. An electric motor comprising a stator constituted as a pot-shaped structure having an internal axial core, and embodying an exciting winding disposed around the core within said structure, which structure is open at one end and bears poles at the rim at the open end, a rotatable armature disposed at the open end of the stator structure and bearing radially projecting poles similarly oriented as the poles on the stator structure, the armature being mounted on a shaft which axially penetrates the axial core of the stator structure, a current interrupter adapted to effect intermittent excitation of the stators exciting winding, so that the poles of the armature, with the armature, are moved at each excitation in the same sense towards alignment each with a pole on the stator and when the excitation is interrupted are permitted to move past the position of alignment to the position of next excitation, said interrupter being electrically connected in circuit with the exciting winding, a multi-toothed device operated by the armature to alternately open and close said interrupter in order to alternately energise and de-energise the exciting winding, and speed-responsive means applied to said multi-toothed device to control the action thereof on said interrupter.

HEINRICH LIST.